(12) United States Patent
Schmidt

(10) Patent No.: US 9,858,728 B2
(45) Date of Patent: Jan. 2, 2018

(54) INTERACTIVE TOOL FOR INSPECTING AND REPAIRING THREE DIMENSIONAL MODELS

(71) Applicant: AUTODESK, INC., San Rafael, CA (US)

(72) Inventor: Ryan Michael Schmidt, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 190 days.

(21) Appl. No.: 13/790,794

(22) Filed: Mar. 8, 2013

(65) Prior Publication Data

US 2014/0253541 A1    Sep. 11, 2014

(51) Int. Cl.
*G06T 15/00* (2011.01)
*G06T 19/20* (2011.01)
*G06F 3/0481* (2013.01)
*G06F 3/0484* (2013.01)

(52) U.S. Cl.
CPC .......... *G06T 19/20* (2013.01); *G06F 3/04815* (2013.01); *G06F 3/04845* (2013.01); *G06T 2200/24* (2013.01); *G06T 2219/2021* (2013.01)

(58) Field of Classification Search
CPC . G06F 3/04815; G06F 3/04845; G06T 19/20; G06T 2200/24; G06T 2219/2021; G06T 7/00
See application file for complete search history.

(56) References Cited

U.S. PATENT DOCUMENTS

| | | | | |
|---|---|---|---|---|
| 8,477,154 | B2* | 7/2013 | Davis et al. | 345/653 |
| 2004/0239643 | A1* | 12/2004 | Bangham | G06F 3/0482 345/173 |
| 2008/0134094 | A1* | 6/2008 | Samadani et al. | 715/838 |
| 2013/0004060 | A1* | 1/2013 | Bell et al. | 382/154 |

OTHER PUBLICATIONS

Bendels et al., Detecting Holes in Point Set Surfaces, Journal of WSCG 2006, vol. 14, No. 1-3 p. 89-96, URL:https://dspace.zcu.cz/handle/11025/1350.*

* cited by examiner

*Primary Examiner* — Frank Chen
(74) *Attorney, Agent, or Firm* — Artegis Law Group, LLP

(57) ABSTRACT

A mesh repair application within a rendering engine is configured to generate a graphical user interface (GUI) that allows an end-user of the rendering engine to inspect and repair various defects associated with a three-dimensional (3D) model. The GUI provides a filmstrip that includes different visual representations of the various defects. When the end-user selects a given representation, the mesh repair application updates the GUI to display a detailed view of the defect associated with the selected visual representation. An advantage of the approach described herein is that the repair of defects associated with the 3D model may be expedited.

23 Claims, 7 Drawing Sheets

INTERACTIVE TOOL FOR INSPECTING AND REPAIRING THREE DIMENSIONAL MODELS

BACKGROUND OF THE INVENTION

Field of the Invention

The present invention generally relates to computer graphics and, more specifically, to an interactive tool for inspecting and repairing three-dimensional models.

Description of the Related Art

A conventional rendering application may be configured to generate a three-dimensional (3D) model that represents the surface of an object within a 3D environment. The object could be, e.g., a real-world object such as a human being, or a virtual object such as a video game character. The 3D model that represents the object may, in some cases, include various defects where the surface of that model is not properly defined by the rendering application. A defect could be, for example, a hole in the 3D model, a detached portion of the 3D model, or a non-manifold region of the 3D model that includes improperly connected vertices and/or edges.

The defects mentioned above, as well as other possible types of defects, may be introduced by the rendering application as a consequence of unsuccessful generation of the 3D model. For example, in the field of three-dimensional scanning, a rendering application may generate an incomplete 3D model that partially represents a real-world object based on an incomplete set of data points received from a 3D scanner. Since 3D scanners typically cannot scan regions of real-world objects that are not visible to the 3D scanner, the set of data points provided by the 3D scanner typically will not include data points that represent those non-visible regions. In such a situation, those regions may simply appear as a hole-type defect in the 3D model.

When a 3D model includes defects, the end-user of the rendering application may attempt to repair those defects either manually or by way of automated model repair algorithms. In either case, the end-user is usually required to locate the defects requiring repair prior to initiating any type of repair operation. However, defects in 3D models may have a wide range of sizes, and, in some situations, may be so small relative to the overall size of the 3D model as to be completely invisible to the end-user. Consequently, the end-user may have significant trouble locating and repairing all defects associated with the 3D model.

As the foregoing illustrates, what is needed in the art is a more effective approach for repairing defects in a 3D model.

SUMMARY OF THE INVENTION

One embodiment of the invention includes a computer-implemented method for repairing a set of defects associated with a three-dimensional (3D) model, including analyzing the 3D model to identify the set of defects, rendering a first image that represents the 3D model from a first viewing position, generating within the first image a set of defect indicators, where each defect indicator is associated with a different defect in the 3D model and resides at a different location within the first image, rendering a different thumbnail image for each defect in the set of defects, where the thumbnail image associated with a particular defect shows the particular defect from a given viewing position, and causing a graphical user interface (GUI) to display the first image and the filmstrip that includes the thumbnail images to the end-user.

One advantage of the disclosed technique is that defects associated with a 3D model may be clearly indicated to the end-user, thereby allowing the end-user to manually or automatically repair those defects quickly.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
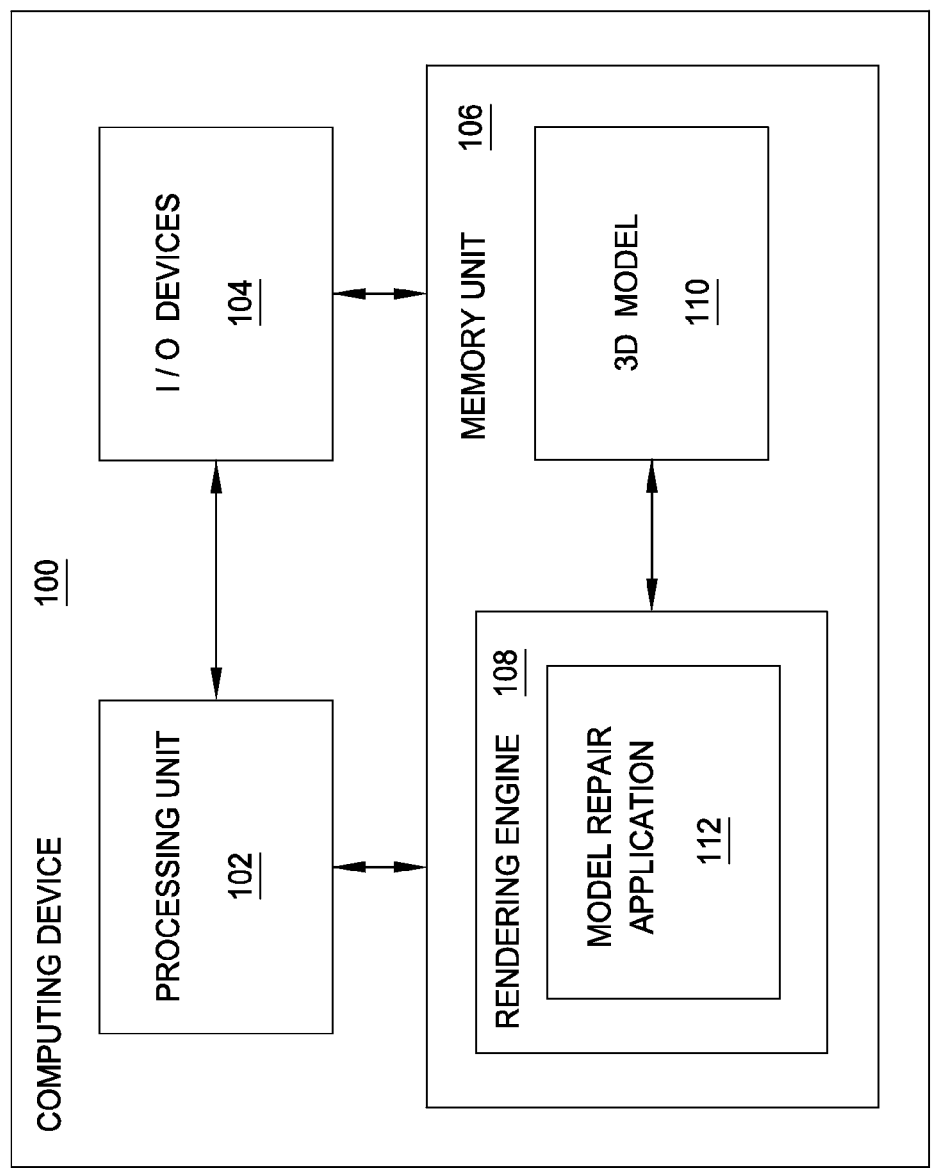
FIG. 1 illustrates a computing device configured to implement one or more aspects of the present invention.

FIG. 1 illustrates a computing device 100 configured to implement one or more aspects of the present invention. As shown, computing device 100 includes a processing unit 102 coupled to input/output (I/O) devices 104 and to a memory 106. Processing unit 102 may be a central processing unit (CPU), a graphics processing unit (GPU), or a combination of different processing units, such as a CPU configured to operate in conjunction with a GPU. In general, processing unit 102 may be any technically feasible hardware unit capable of processing data and/or executing software applications.

I/O devices 104 are also coupled to memory 106 and may include devices capable of receiving input, such as a keyboard, a mouse, a video camera, a three-dimensional (3D) scanner, and so forth, as well as devices capable of providing output, such as a display device, a speaker, and so forth. Additionally, I/O devices may include devices capable of both receiving input and providing output, such as a touchscreen, a universal serial bus (USB) port, and so forth. I/O devices 104 may be configured to receive various types of input from an end-user of computing device 100, and to also provide various types of output to the end-user of computing device 100.

Memory 106 is configured to store data and may include a hard disk, a random access memory (RAM) module, a flash memory unit, or any other type of memory unit or combination thereof. Processing unit 102 and I/O devices 104 are configured to read data from and write data to memory 106. Memory 106 includes a rendering engine 108 and a 3D model 110. 3D model 110 is a mathematical model of a 3D object, and may include a polygonal mesh, a point cloud, a wireframe model, or a manifold, among other types of mathematical models. 3D model 110 could represent a real-world object, such as, for example, a human being, or could also represent a virtual object, such as, e.g., a video game character. In one embodiment, 3D model 110 is generated based on data received from a 3D scanner within I/O devices 104 and represents a scanned, real-world object.

Rendering engine 108 is a software application configured to generate and/or modify 3D model 110. Rendering engine 108 is also configured to render pixels that represent 3D model 110 to a display device included within I/O devices 104. Rendering engine 108 may perform various other operations with 3D model 110, including texture mapping and mesh transformation operations, and may also receive user input specifying different modifications and/or repairs to be made to 3D model 110. Rendering engine 108 includes a model repair application 112 that is configured to generate a model inspection and repair GUI. The model inspection and repair GUI allows an end-user of rendering engine 108 to inspect and repair defects within 3D model 110, as discussed in greater detail below in conjunction with FIGS. 2-5.

Figure 2:
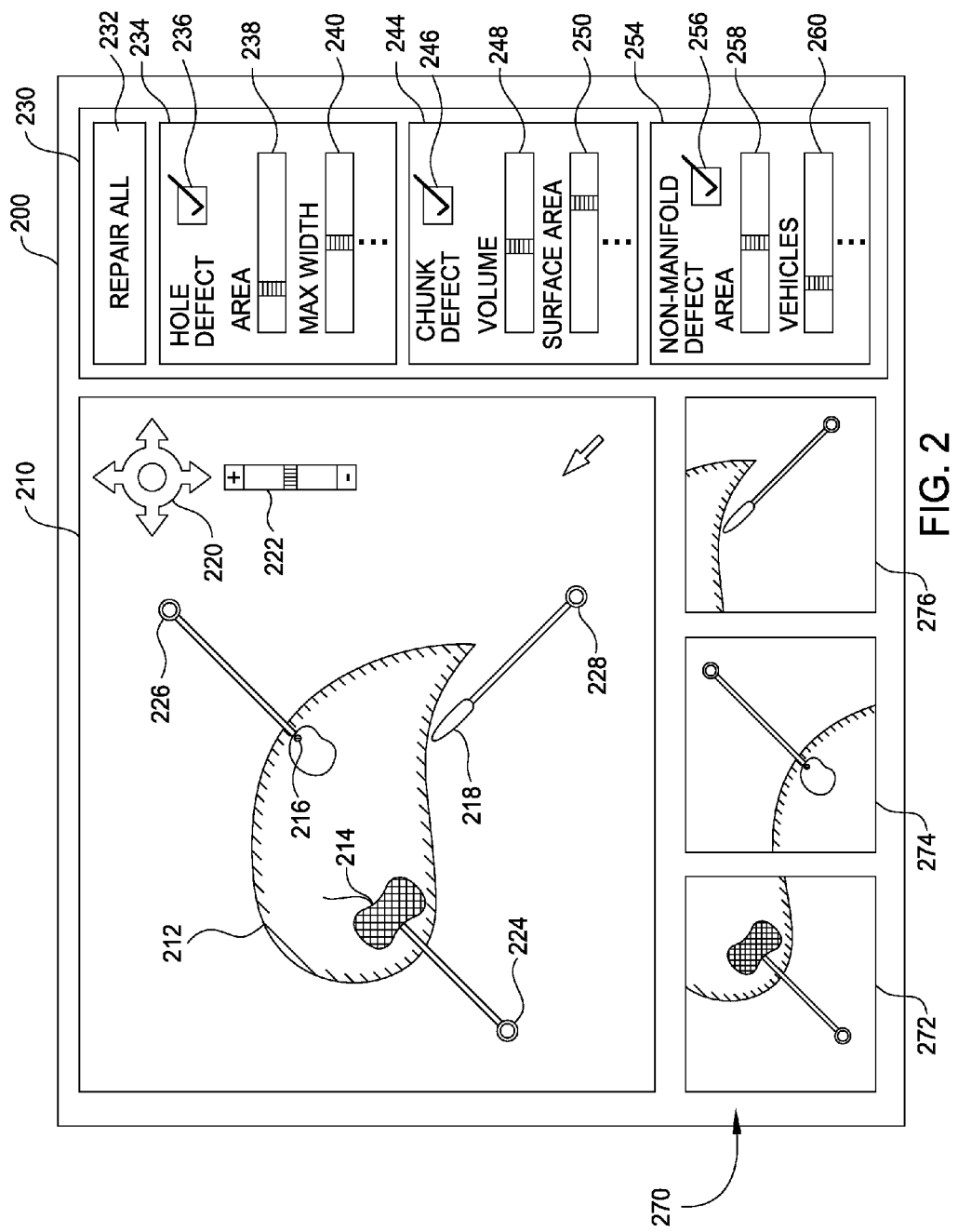
FIG. 2 is a screenshot of a model inspection and repair graphical user interface (GUI) configured to indicate a set of defects in a 3D model, according to one embodiment of the present invention.

FIG. 2 is a screenshot of a model inspection and repair GUI 200 configured to indicate a set of defects in a 3D model, according to one embodiment of the present invention. Model repair application 112 is configured to generate model inspection and repair GUI 200 (referred to hereinafter simply as "GUI 200") and each GUI element included therein, as well as to implement the various functionalities associated with that GUI 200 and each included GUI element. In operation, GUI 200 may be utilized by an end-user or developer to find and repair defects in a 3D model, such as 3D model 110 of FIG. 1, as set forth herein.

As shown, GUI 200 includes a viewport 210, a control panel 230, and a filmstrip 270. Model viewport 210 illustrates 3D model 212, a tumble control 220, and a zoom control 222. 3D model 212 is a representation of 3D model 110 shown in FIG. 1 and illustrates a view of that 3D model 110. Tumble control 220 allows the end-user to tumble 3D model 212, while zoom control 222 allows the end-user to zoom into specific regions of 3D model 212 or to zoom out from a current view of 3D model 212.

In model viewport 210, 3D model 212 is illustrated as having various different defects, including a defect 214, a defect 216, and defect 218. In addition, various defect indicators are displayed that indicate the location of those different defects. Defect indicator 224 indicates defect 214, defect indicator 226 indicates defect 216, and defect indicator 228 indicates defect 218. When rendering 3D model 212, model repair application 112 is configured to analyze that model to identify various defects, and to then display defect indicators that indicate the locations of the identified defects, as is shown. In doing so, model repair application 112 may analyze data underlying 3D model 212, such as e.g. data included within 3D model 110 and apply various defect identification algorithms to identify different types of defects.

3D model 212 may include a variety of different types of defects depending on the type of that 3D model 212. For example, in situations where 3D model 212 is a polygonal mesh, that mesh may include defects such as holes, detached portions of 3D model 212, or non-manifold regions of 3D model 212, among other types of defects associated with polygonal meshes. Alternatively, in situations where 3D model 212 is a 3D model of a building, a defect could represent a portion of that building that violates a building code or some other set of architectural rules, among other types of defects associated with 3D models of buildings. In practice, model repair application 112 is configured to identify defects within 3D model 212 based on the type of that model 110. In the exemplary embodiment discussed in conjunction with FIG. 2, 3D model 212 may be a polygonal mesh, and defects 214, 216, and 218 may be a hole defect, a detached portion defect (i.e. a "chunk" defect), and a non-manifold defect, respectively.

Control panel 230 includes a variety of GUI elements that allow the end-user to repair and/or alter the display of the defects shown in viewport 210 relative to 3D model 212. As shown, control panel 230 includes a repair all button 323, as well as a hole defect panel 234, a chunk defect panel 244, and a non-manifold defect panel 254. When the end-user clicks the repair all button 232 (e.g., by operation of a cursor), model repair application 112 is configured to automatically repair all defects found within 3D model 212 and/or shown within viewport 210. As mentioned above, model repair application 112 may implement a wide variety of different algorithms capable of repairing some or all of the different defects that may be identified and/or shown by model repair application 112.

Each defect panel (i.e., 234, 244, or 254) exposes a set of controls that allows the end-user to alter the display of a corresponding type of defect. For example, hole defect panel 234 includes a checkbox 236 that, when checked, causes model repair engine 112 to display defect indicators within viewport 210 that indicate hole defects, such as defect indicator 224 that indicates hole defect 214. When checkbox 236 is not checked, model repair engine 112 may not display those defect indicators within viewport 210. Additionally, hole defect panel 234 includes a set of filters that may be applied to cause model repair engine 112 to selectively display certain defect indicators and not others. In FIG. 2, those filters are represented by slider elements, although persons skilled in the art will recognize that any reasonable GUI element could be implemented to represent a filter. As is shown, an area slider 238 allows the end-user to interactively select a maximum hole area. Based on the selected maximum hole area, model repair application 112 is configured to display defect indicators for hole defects having an area that is greater than the selected maximum hole area. Similarly, a width slider 240 allows the end-user to interactively select a maximum hole width. Based on the selected maximum hole width, model repair application 112 is configured to display defect indicators for hole defects having a maximum width that is greater than the selected maximum hole width.

Similar to hole defect panel 234, chunk defect panel 244 includes a checkbox 246 that allows the end-user to toggle the display of chunk defect indicators, and also includes a volume slider 248 and a surface area slider 250. As mentioned above, a "chunk" refers to a detached portion of 3D model 212 and is referred to as thus for the sake of brevity.

The end-user may select a maximum chunk volume for which chunk defect indicators should be displayed by interacting with volume slider 248. Likewise, the end-user may select a maximum chunk defect surface area for which chunk defect indicators should be displayed by interacting with surface area slider 250. In general, the particular types of filters displayed within a given defect panel relate to properties corresponding to the type of defect associated with that defect panel. Accordingly, since the defect panels shown within control panel 230 relate to different types of defects, those different panels may include different types of filters.

Non-manifold defect panel 254 includes a checkbox 256 that allows the end-user to toggle the display of non-manifold defects, as well as an area slider 258 and a vertices slider 260. The end-user may select a maximum non-manifold defect area for which non-manifold defect indicators should be displayed by interacting with area slider 258. Likewise, the end-user may select a maximum number of non-manifold vertices for which non-manifold defect indicators should be displayed by interacting with vertices slider 260.

In addition to generating the various defect panels described herein, model repair application 112 may also generate a wide range of other defect panels for 3D model 212, for other 3D models, or for other types of 3D models. For example, model repair application 112 may generate a set of defect panels for a computer-aided design (CAD)-type model, each of which may allow the end-user to selectively alter the display of defect indicators associated with a given type of defect that may be found within a CAD-type model. Persons skilled in the art will recognize that the specific GUI elements described herein, as well as the physical layout of those elements shown in FIG. 2, are provided for exemplary purposes only in order to aid in the description of the functionality of mesh repair application 112, and should not limit the scope of the application in any way.

Model repair application 112 is also configured to generate a set of viewing positions for the various defects identified within 3D model 212, and, from each such viewing position, generate a thumbnail image of the defect corresponding to that viewing position. Model repair application 112 is configured to collect these different thumbnail images into filmstrip 270 shown in FIG. 2. As shown, filmstrip 270 includes thumbnail image 272, thumbnail image 274, and thumbnail image 276. Thumbnail image 272 illustrates defect 214 and defect indicator 224, thumbnail image 274 illustrates defect 216 and defect indicator 226, and thumbnail image 276 illustrates defect 218 and thumbnail image 228. In general, model repair application 112 generates a viewing position and corresponding thumbnail image for a given defect that optimally captures that defect, so that the end-user, upon inspection of the defect from the corresponding viewing position, is able to view the defect in detail.

The end-user may inspect a given defect in detail by viewing the corresponding thumbnail image within filmstrip 270, or by selecting the corresponding thumbnail image (e.g., by operation of a cursor or keyboard). Upon receiving the selection of a thumbnail image from the end-user, model repair application 112 is configured to update viewport 210 to display the defect associated with that thumbnail image from the corresponding viewing position, as described in greater detail below in conjunction with FIGS. 3-5.

Figure 3:
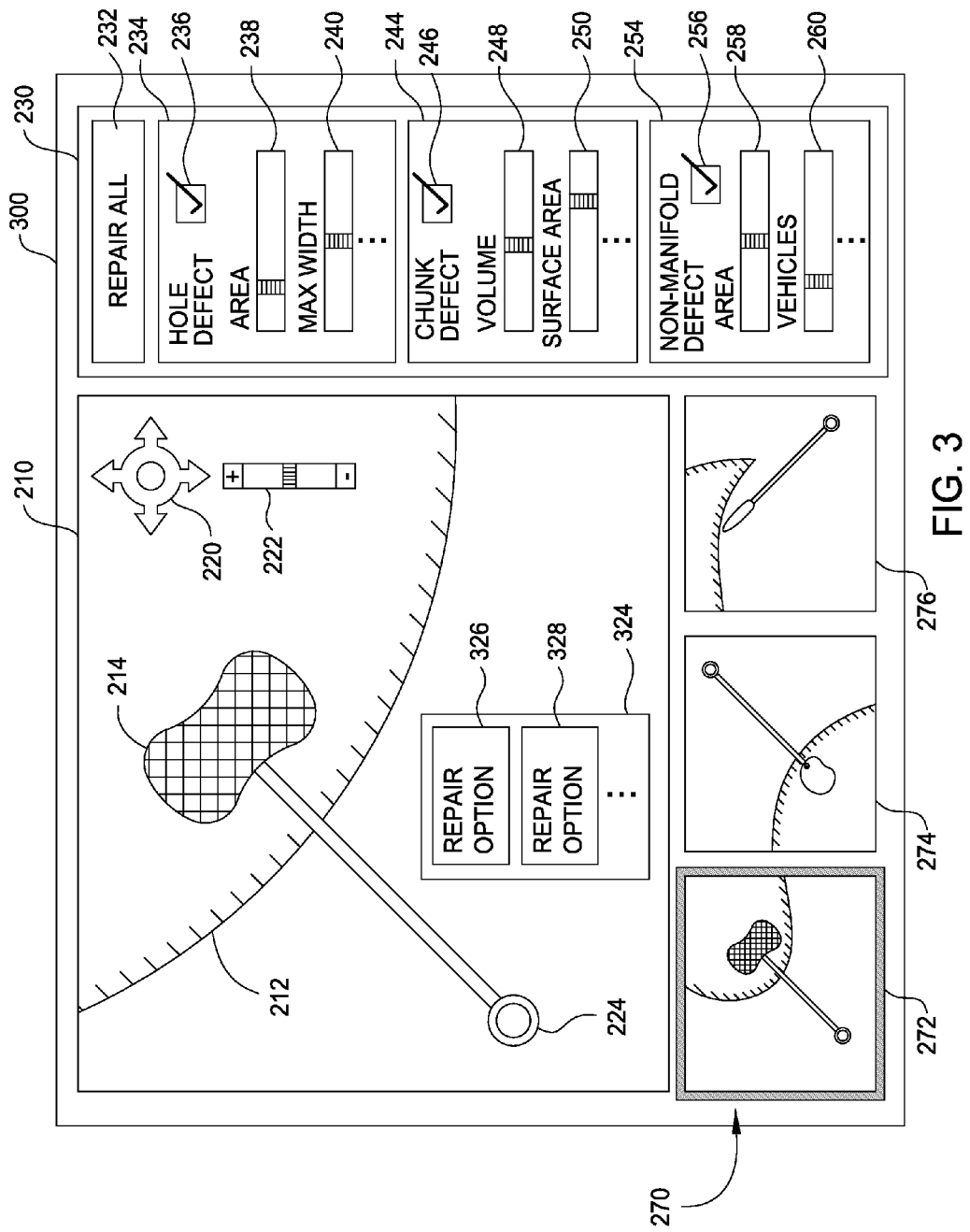
FIG. 3 is a screenshot of the model inspection and repair GUI shown in FIG. 2, according to another embodiment of the present invention.

FIG. 3 is screenshot of GUI 200 shown in FIG. 2, according to another embodiment of the present invention. As shown, GUI 200 includes similar GUI elements as shown in FIG. 2, including viewport 210, control panel 230, and filmstrip 270. However, certain portions of GUI 200 have been updated in response to model repair application 112 receiving from the end-user a selection of thumbnail image 272. As shown, thumbnail image 272 is now highlighted, and viewport 210 now illustrates a close-up view of defect 214 and defect indicator 224.

Upon receiving the selection of thumbnail image 272 from the end-user, model repair application 112 is configured to replace the image previously shown in viewport 210 with an image rendered from the perspective of the viewing position associated with defect 214. As mentioned above, model repair application 112 is configured to generate a viewing position for a given defect in order to display that defect to the end-user in detail.

Model repair application 112 is also configured to receive input from the end-user that indicates various different actions that may be executed relative to defect 214. For example, the end-user may left-click defect indicator 224 in order to cause model repair application 112 to automatically repair defect 214. The end-user may also right-click defect indicator 224 in order to cause model repair application 112 to generate a context menu 324.

The context menu 324 may include different repair options, such as repair option 326 or repair option 328, which may correspond to different automatic repair algorithms to be executed in order to repair defect 214. A given repair option may also allow the end-user to manually repair defect 214, and may provide various tools relevant to repairing the associated defect type. Context menu 324 may also include other options, such as a "lock" option that causes model repair application 112 to ignore defect 214. Once a given defect has been repaired or locked, model repair application 112 may cause the corresponding defect indicator to change color or disappear entirely.

Figure 4:
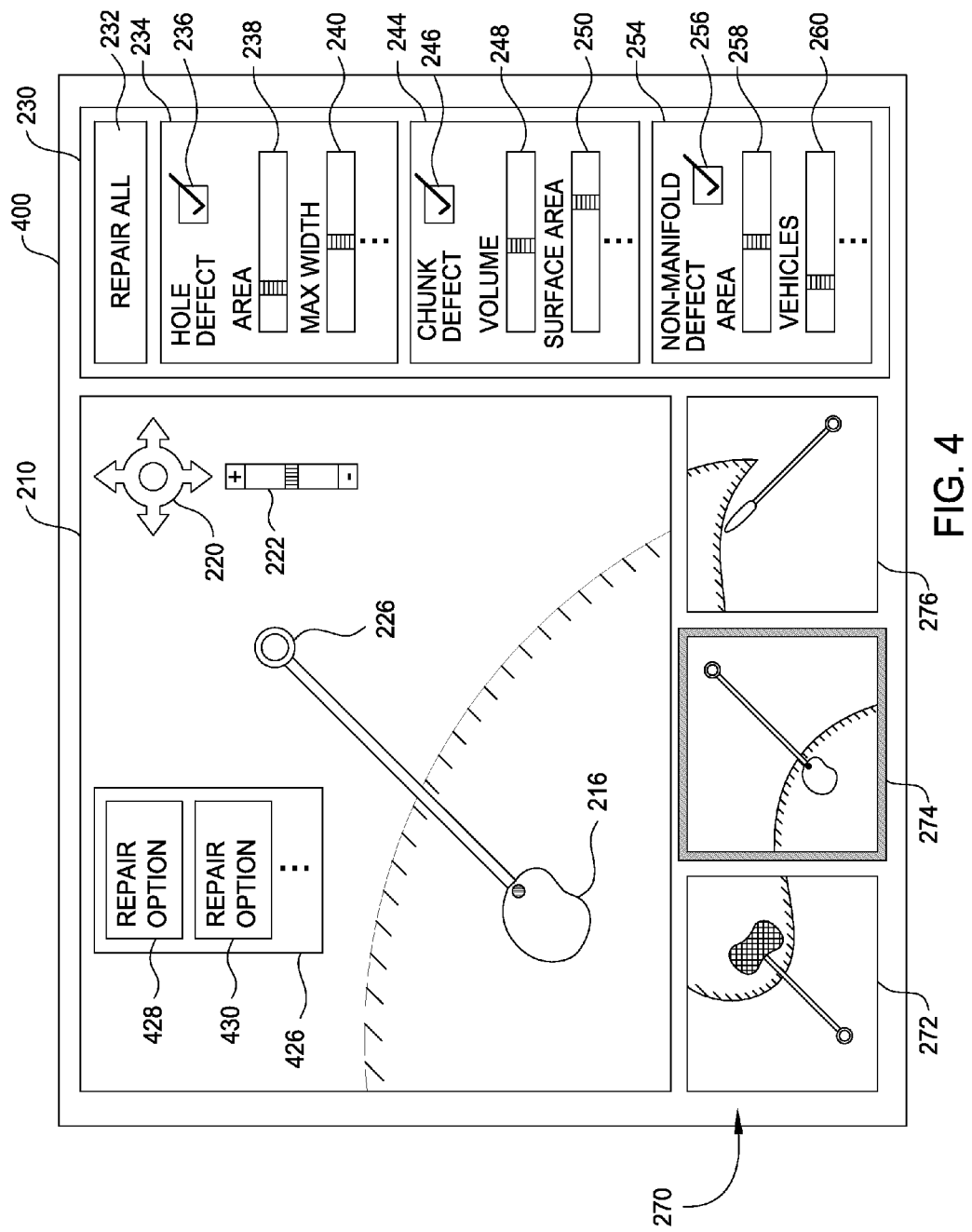
FIG. 4 is a screenshot of the model inspection and repair GUI shown in FIG. 2, according to another embodiment of the present invention.

FIG. 4 is a screenshot of GUI 200 shown in FIG. 2, according to another embodiment of the present invention. As shown, GUI 200 includes similar GUI elements as shown in FIG. 2, including viewport 210, control panel 230, and filmstrip 270. However, certain portions of GUI 200 have been updated in response to model repair application 112 receiving from the end-user a selection of thumbnail image 274. As shown, thumbnail image 274 is now highlighted, and viewport 210 now illustrates a close-up view of defect 216 and defect indicator 226.

Upon receiving the selection of thumbnail image 274 from the end-user, model repair application 112 is configured to replace the image previously shown in viewport 210 with an image rendered from the perspective of the viewing position associated with defect 216, in similar fashion as discussed above in conjunction with FIG. 3. The end-user may then left-click defect indicator 226 to cause model repair application 112 to automatically repair defect 216, or the end-user may then right-click defect indicator 226 to cause model repair engine 112 to display context menu 426.

Context menu 426 includes repair option 428 and repair option 430, which may correspond to different automatic repair algorithms to be executed in order to repair defect 216. In practice, model repair application 112 may display different repair options within a given context menu based on the type of defect for which that context menu was generated. For example, repair options 428 and 430 may correspond to different algorithms capable of repairing the chunk-type defect shown in FIG. 4 (i.e., defect 216), and may thus be different from the repair options shown in other Figures described herein. Context menu 426 may also include additional options similar to those described above relative to context menu 326 shown in FIG. 3, including a "manual repair" option and a "lock" option.

Figure 5:
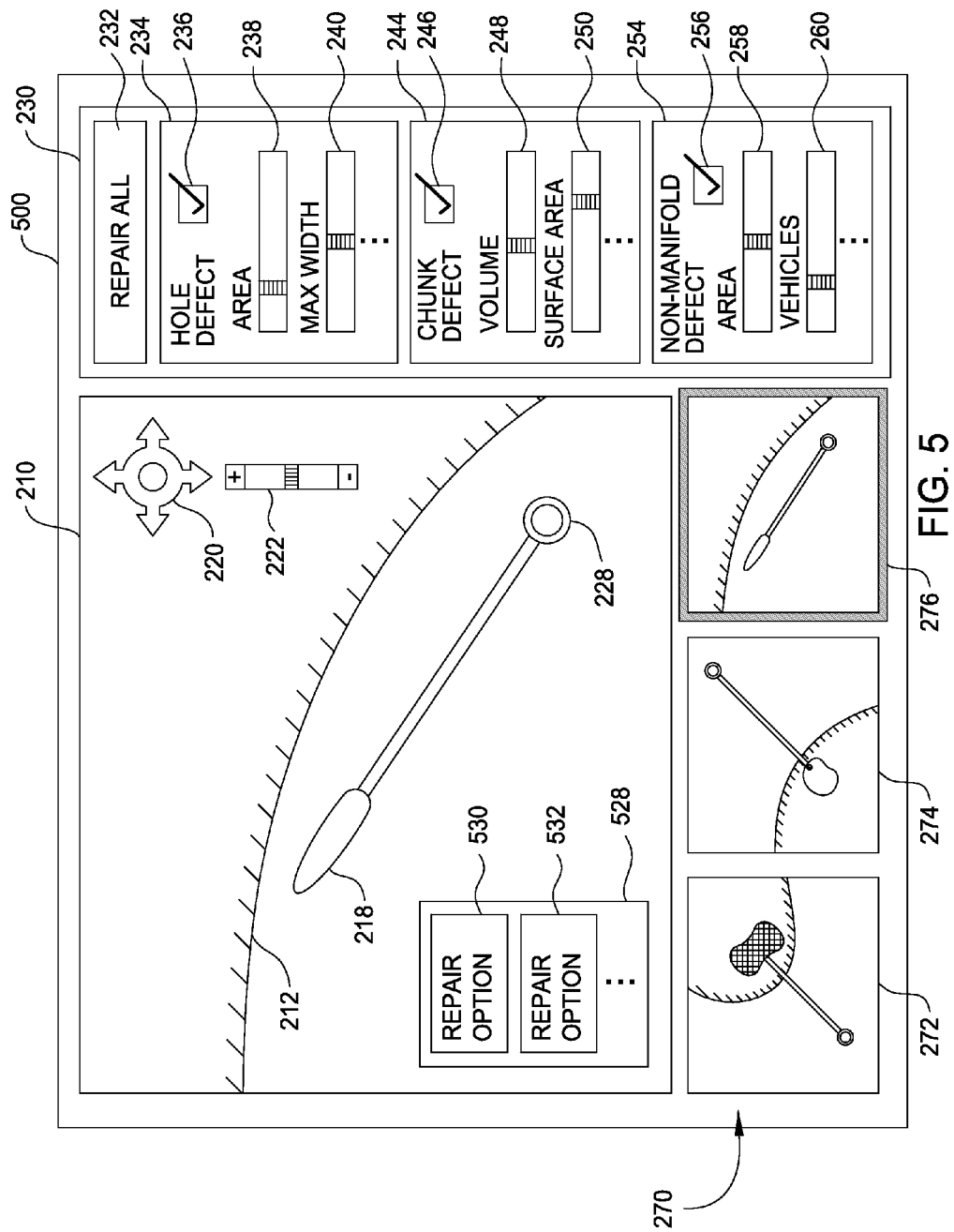
FIG. 5 is a screenshot of the model inspection and repair GUI shown in FIG. 2, according to yet another embodiment of the present invention.

FIG. 5 is a screenshot of GUI 200 shown in FIG. 2, according to yet another embodiment of the present invention. As shown, GUI 200 includes similar GUI elements as shown in FIG. 2, including viewport 210, control panel 230, and filmstrip 270. However, certain portions of GUI 200 have been updated in response to model repair application 112 receiving from the end-user a selection of thumbnail image 276. As shown, thumbnail image 276 is now highlighted, and viewport 210 now illustrates a close-up view of defect 218 and defect indicator 228.

In similar fashion as described above in conjunction with FIGS. 3-4, the end-user may left-click defect indicator 228 to cause model repair application 112 to automatically repair defect 218, or right-click defect indicator 228 to cause model repair engine 112 to display context menu 528. The end-user may then interact with context menu 528 in an analogous fashion to the different interactions described in conjunction with FIGS. 3-4, relative to defect 218 and defect indicator 228.

Persons skilled in the art will recognize that the techniques described above may be implemented independently of one another, and that certain techniques may be omitted altogether without departing from the overall scope of the invention. For example, any of the context menus described above in conjunction with FIGS. 3-5 could be displayed without mesh repair application 112 first receiving a selection of a particular defect, and could thus be shown within viewport 210 shown in FIG. 2 relative to 3D model 212 also shown therein.

By implementing the GUI 200 described above in conjunction with FIG. 2-5, mesh repair application 112 is configured to provide various tools that allow the end-user to inspect a 3D model and repair associated defects in a simple and streamlined fashion. Some of the techniques implemented by model repair application 112 for providing these various tools are described in greater detail below in conjunction with FIGS. 6-7.

Figure 6:
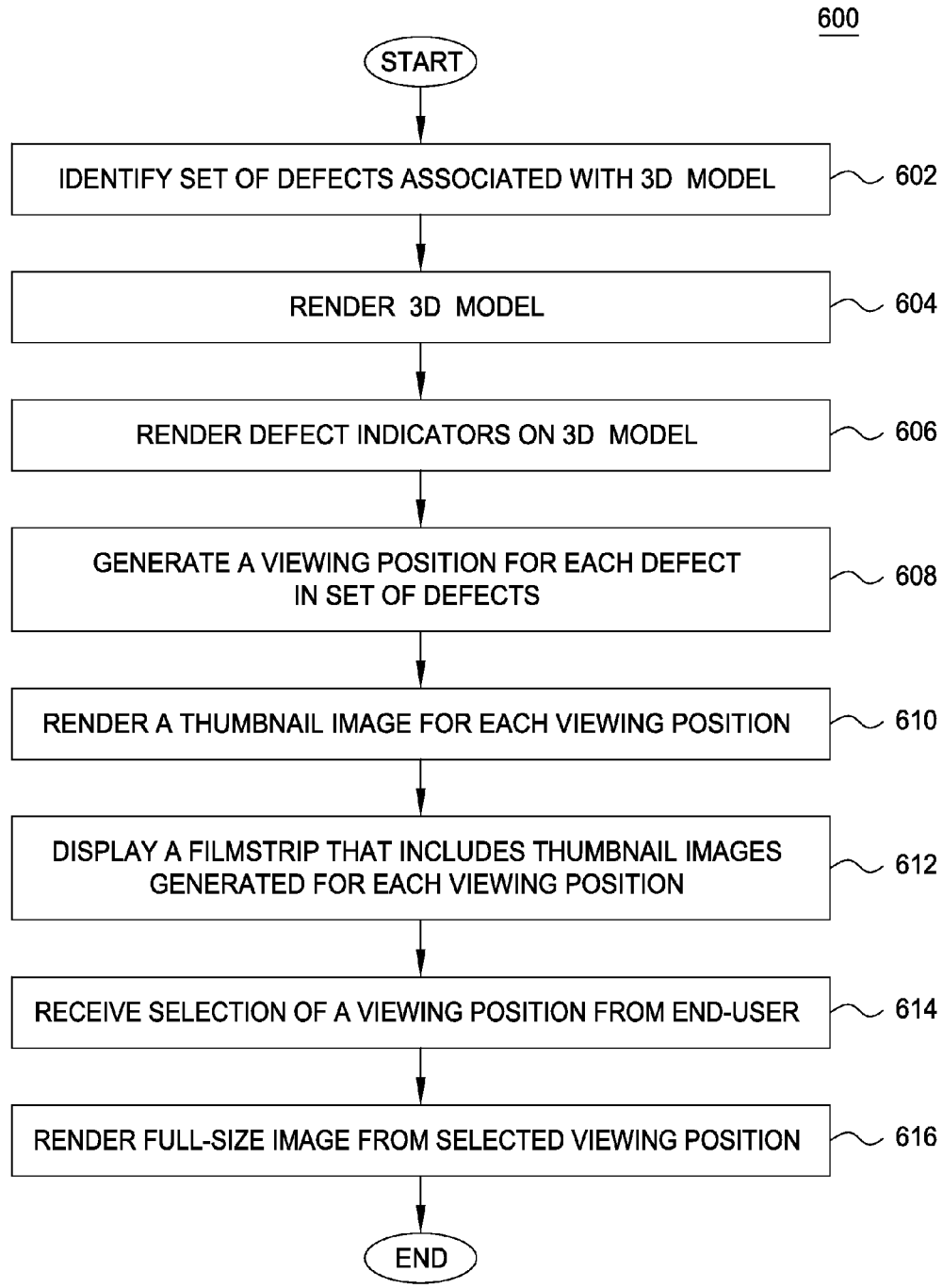
FIG. 6 is a flow diagram of method steps for indicating to an end-user a set of defects associated with a 3D model, according to one embodiment of the present invention.

FIG. 6 is a flow diagram of method steps for indicating to the end-user a set of defects associated with a 3D model, such as 3D model 110, according to one embodiment of the invention. Although the method steps are described in conjunction with the systems of FIGS. 1-5, persons skilled in the art will understand that any system configured to perform the method steps, in any order, is within the scope of the present invention.

As shown, a method 600 begins at step 602, where model repair application 112 identifies a set of defects associated with 3D model 110. The defects could be, for example, defects 214, 216, and/or 216 shown in FIG. 2. At step 604, mesh repair application 112 renders an image that represents the 3D model from a given viewing angle. The rendered image could be, for example, the image shown within viewport 210 shown in FIG. 2, and could include 3D model 212. Again, 3D model 212 is a representation of 3D model 110 shown in FIG. 1 and illustrates a view of that 3D model 110.

At step 606, mesh repair application 112 renders defect indicators for each defect in the set of defects identified at step 602. The defect indicators could be, for example, defect indicators 224, 226, and 228 that indicate defects 214, 216, and 218, respectively. At step 608, mesh repair application 112 generates a viewing position for each defect in the set of defects. A given viewing position generated for a particular defect may represent a position or a "best" position from which an end-user can view the particular defect in detail.

At step 610, mesh repair application 112 generates a thumbnail image for each viewing position. A given thumbnail image represents the defect associated with the viewing position and illustrates a detail view of that defect from that viewing position. For example, thumbnail image 272 shown in FIGS. 2-5 illustrates a detail view of defect 214. At step 612, mesh repair application 112 displays a filmstrip that includes the thumbnail images generated at step 610. The filmstrip could be, for example, filmstrip 270 that includes thumbnail images 272, 274, and 276 shown in FIGS. 2-5.

At step 612, mesh repair application 112 receives a selection of a viewing position from the end-user. The end-user could, for example, select a thumbnail image from within the filmstrip generated at step 612. Mesh repair application 112 could then determine the viewing position associated with the selected thumbnail image. At step 616, mesh repair application 112 renders a full size image from the viewing position selected at step 614. The full-size image represents a detail view of the defect associated with the selected viewing position.

By implementing the approach described above, mesh repair application 112 allows an end user to quickly identify and inspect various defects that may be included within a 3D model. Mesh repair application 112 may then repair those defects by implementing an approach described below in conjunction with FIG. 7.

Figure 7:
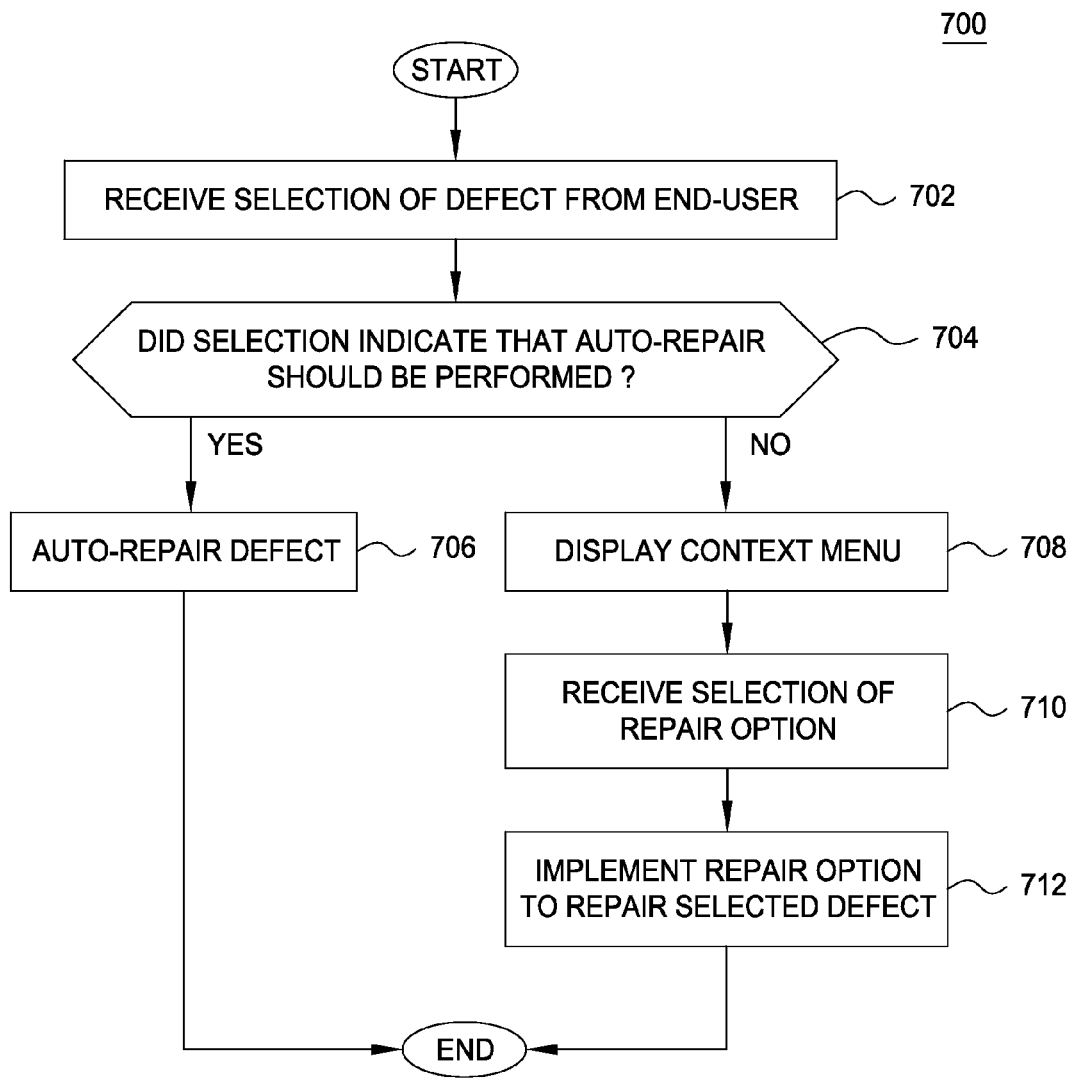
FIG. 7 is a flow diagram of method steps for repairing a defect associated with a 3D model, according to one embodiment of the present invention.

FIG. 7 is a flow diagram of method steps for repairing a defect associated with 3D model 110, according to one embodiment of the invention. Although the method steps are described in conjunction with the systems of FIGS. 1-5, persons skilled in the art will understand that any system configured to perform the method steps, in any order, is within the scope of the present invention.

As shown, a method 700 begins at step 702, where mesh repair application 112 receives a selection of a defect from the end-user. The end-user could, for example, click on a defect indicator associated with the defect. At step 704, mesh repair application 112 determines whether the selection indicated that an auto-repair operation should be performed. If mesh repair application 112 determines that the selection indicated that an auto-repair operation should be performed, such as, e.g. when the selection is a left-click operation, then the method 600 proceeds to step 706. At step 706, mesh repair application 112 auto-repairs the defect. Mesh repair application 112 could, for example, implement a default repair algorithm for the type of defect selected at step 702. The method then ends.

If at step 704, mesh repair application 112 determines that the selection indicated that an auto-repair operation should not be performed, such as, e.g., when the selection is a right-click operation, then the method 700 proceeds to step 708. At step 708, mesh repair application 112 displays a context menu associated with the type of defect selected at step 702.

At step 710, mesh repair application 112 receives a selection of a repair option associated with the context menu. The different repair options associated with the context menu may vary depending on the type of defect selected at step 702. At step 712, mesh repair application 112 implements the selected repair option to repair the selected defect. In one embodiment, the selected repair option is a manual repair option, and mesh repair application 112 provides relevant tools to the end-user to facilitate the manual repair of the defect. The method then ends. By implementing the approach described above, mesh repair application 112 allows the end-user to quickly repair defects associated with a 3D model.

In sum, a mesh repair application within a rendering engine is configured to generate a graphical user interface (GUI) that allows an end-user of the rendering engine to inspect and repair various defects associated with a three-dimensional (3D) model. The GUI provides a filmstrip that includes different visual representations of the various defects. When the end-user selects a given representation, the mesh repair application updates the GUI to display a detailed view of the defect associated with the selected visual representation. An advantage of the approach described herein is that the repair of defects associated with the 3D model may be expedited.

Advantageously, defects associated with the 3D model may be clearly indicated to the end-user, thereby allowing the end-user to manually or automatically repair those defects quickly.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for repairing a set of defects associated with a three-dimensional (3D) model, the method comprising:
rendering a first image that represents the 3D model from a first viewing position;
receiving a first threshold associated with a first defect parameter via a first user interface element included in a graphical user interface (GUI);
receiving a second threshold associated with the second defect parameter via the second user interface element included in the GUI;
determining a set of defects included in the 3D model based on the first threshold associated with the first defect parameter and the second threshold associated with the second defect parameter, wherein each defect included in the set of defects exceeds the first threshold and the second threshold;
generating within the first image a set of defect indicators, wherein each defect indicator is associated with a different defect in the set of defects and resides at a different location within the first image corresponding to a location of the associated defect within the 3D model;
automatically selecting a different defect viewing position associated with each defect in the set of defects based on the location of the defect within the 3D model, wherein each defect viewing position corresponds to a different angle from which to view the 3D model;
rendering a different thumbnail image for each defect in the set of defects based on the associated defect viewing positions, wherein the thumbnail image associated with a particular defect shows the particular defect from a defect viewing position associated with the particular defect; and
causing the GUI to display the first image and a filmstrip that includes the thumbnail images to the end-user.

2. The computer-implemented method of claim 1, further comprising:
receiving from the end-user a selection of a first thumbnail image that is associated with a first defect included in the set of defects and shows the first defect from a second viewing position;
rendering a second image that represents the 3D model from the second viewing position;
generating within the second image a first defect indicator that is included in the set of defect indicators and is associated with the first defect; and
causing the GUI to display the second image to the end-user on the display device.

3. The computer-implemented method of claim 2, further comprising:
receiving from the end-user a selection of the first defect indicator; and
repairing the first defect by performing a repair operation that is associated with the first defect indicator.

4. The computer-implemented method of claim 3, wherein the repair operation comprises an automatically-performed repair operation implemented by the rendering engine in response to receiving a left-click event.

5. The computer-implemented method of claim 3, further comprising:
causing the GUI to display a context menu that includes a plurality of repair options to the end-user in response to receiving a right-click event;
receiving from the end-user a selection of a repair option from within the plurality of repair options; and
performing the repair operation based on the selection of the repair option from within the plurality of repair options.

6. The computer-implemented method of claim 5, wherein the selection of the repair option comprises a manual repair option.

7. The computer-implemented method of claim 6, wherein the plurality of repair operations is generated based on a defect type associated with the defect.

8. The computer-implemented method of claim 1, wherein a given defect in the set of defects comprises a hole defect, a detached region defect, or a non-manifold region defect.

9. A non-transitory computer-readable medium storing program instructions that, when executed by a processing unit, cause the processing unit to repair a set of defects associated with a three-dimensional (3D) model by performing the steps of:
rendering a first image that represents the 3D model from a first viewing position;
receiving a first threshold associated with a first defect parameter via a first user interface element included in a graphical user interface (GUI);
receiving a second threshold associated with the second defect parameter via the second user interface element included in the GUI;

determining a set of defects included in the 3D model based on the first threshold associated with the first defect parameter and the second threshold associated with the second defect parameter, wherein each defect included in the set of defects exceeds the first threshold and the second threshold;

generating within the first image a set of defect indicators, wherein each defect indicator is associated with a different defect in the set of defects and resides at a different location within the first image corresponding to a location of the associated defect within the 3D model;

automatically selecting a different defect viewing position associated with each defect in the set of defects based on the location of the defect within the 3D model, wherein each defect viewing position corresponds to a different angle from which to view the 3D model;

rendering a different thumbnail image for each defect in the set of defects based on the associated defect viewing positions, wherein the thumbnail image associated with a particular defect shows the particular defect from a defect viewing position associated with the particular defect; and causing the GUI to display the first image and a filmstrip that includes the thumbnail images to the end-user.

10. The non-transitory computer-readable medium of claim 9, further comprising the steps of:
receiving from the end-user a selection of a first thumbnail image that is associated with a first defect included in the set of defects and shows the first defect from a second viewing position;
rendering a second image that represents the 3D model from the second viewing position;
generating within the second image a first defect indicator that is included in the set of defect indicators and is associated with the first defect; and
causing the GUI to display the second image to the end-user on the display device.

11. The non-transitory computer-readable medium of claim 10, further comprising the steps of:
receiving from the end-user a selection of the first defect indicator; and
repairing the first defect by performing a repair operation that is associated with the first defect indicator.

12. The non-transitory computer-readable medium of claim 11, wherein the repair operation comprises an automatically-performed repair operation implemented by the rendering engine in response to receiving a left-click event.

13. The non-transitory computer-readable medium of claim 11, further comprising the steps of:
causing the GUI to display a context menu that includes a plurality of repair options to the end-user in response to receiving a right-click event;
receiving from the end-user a selection of a repair option from within the plurality of repair options; and
performing the repair operation based on the selection of the repair option from within the plurality of repair options.

14. The non-transitory computer-readable medium of claim 13, wherein the selection of the repair option comprises a manual repair option.

15. The non-transitory computer-readable medium of claim 14, wherein the plurality of repair operations is generated based on a defect type associated with the defect.

16. The non-transitory computer-readable medium of claim 9, wherein a given defect in the set of defects comprises a hole defect, a detached region defect, or a non-manifold region defect.

17. The non-transitory computer-readable medium of claim 9, wherein each of the first defect parameter and the second defect parameter comprises at least one of a hole defect area, a hole defect width, a chunk defect volume, a chunk defect surface area, a non-manifold defect area, and a number of non-manifold defect vertices.

18. The non-transitory computer-readable medium of claim 9, wherein each of the first user interface element and the second user interface element comprises at least one of a width slider, a volume slider, an area slider, and a vertices slider.

19. A computing device configured to repair a set of defects associated with a three-dimensional (3D) model, including:
a processor configured to:
render a first image that represents the 3D model from a first viewing position,
receive a first threshold associated with a first defect parameter via a first user interface element included in a graphical user interface (GUI);
receive a second threshold associated with the second defect parameter via the second user interface element included in the GUI;
determine a set of defects included in the 3D model based on the first threshold associated with the first defect parameter and the second threshold associated with the second defect parameter, wherein each defect included in the set of defects exceeds the first threshold and the second threshold;
generate within the first image a set of defect indicators, wherein each defect indicator is associated with a different defect in the set of defects and resides at a different location within the first image corresponding to a location of the associated defect within the 3D model;
automatically select a different defect viewing position associated with each defect in the set of defects based on the location of the defect within the 3D model, wherein each defect viewing position corresponds to a different angle from which to view the 3D model;
render a different thumbnail image for each defect in the set of defects based on the associated defect viewing positions, wherein the thumbnail image associated with a particular defect shows the particular defect from a defect viewing position associated with the particular defect, wherein the thumbnail image associated with a particular defect shows the particular defect from a given viewing position; and
cause the GUI to display the first image and a filmstrip that includes the thumbnail images to the end-user.

20. The computing device of claim 19, further including:
a memory unit coupled to the processor and storing program instructions that, when executed by the processor, cause the processor to:
analyze the 3D model,
render the first image,
generate the set of defect indicators,
render a different thumbnail image for each defect in the set of defects, and cause the GUI to display the first image and the filmstrip that includes the thumbnail images to the end-user.

21. The computing device of claim 19, wherein the processor is further configured to:
   receive from the end-user a selection of a first thumbnail image that is associated with a first defect included in the set of defects and shows the first defect from a second viewing position;
   render a second image that represents the 3D model from the second viewing position;
   generate within the second image a first defect indicator that is included in the set of defect indicators and is associated with the first defect; and
   cause the GUI to display the second image to the end-user on the display device.

22. The computing device of claim 21, wherein the processor is further configured to:
   receive from the end-user a selection of the first defect indicator, and
   repair the first defect by performing a repair operation that is associated with the first defect indicator.

23. A non-transitory computer-readable medium storing program instructions that, when executed by a processing unit, cause the processing unit to repair a set of defects associated with a three-dimensional (3D) model by performing the steps of:
   rendering a first image that represents the 3D model from a first viewing position;
   receiving a first threshold associated with a first defect parameter via a first user interface element included in a graphical user interface (GUI);
   receiving a second threshold associated with the second defect parameter via the second user interface element included in the GUI;
   determining a set of defects included in the 3D model based on the first threshold associated with the first defect parameter and the second threshold associated with the second defect parameter, wherein each defect included in the set of defects exceeds the first threshold and the second threshold;
   generating within the first image a set of defect indicators, wherein each defect indicator is associated with a different defect in the set of defects and resides at a different location within the first image;
   rendering a different thumbnail image for each defect in the set of defects, wherein the thumbnail image associated with a particular defect shows the particular defect from a given viewing position; and
   causing the GUI to display the first image and a filmstrip that includes the thumbnail images to the end-user.

* * * * *